United States Patent [19]

Dunfield et al.

[11] Patent Number: 5,254,914
[45] Date of Patent: Oct. 19, 1993

[54] POSITION DETECTION FOR A BRUSHLESS DC MOTOR WITHOUT HALL EFFECT DEVICES USING A MUTUAL INDUCTANCE DETECTION METHOD

[75] Inventors: John C. Dunfield; Gunter K. Heine, both of Santa Cruz County, Calif.

[73] Assignee: Seagate Technology, Inc., Scotts Valley, Calif.

[21] Appl. No.: 546,236

[22] Filed: Jun. 29, 1990

[51] Int. Cl.$^5$ .............................. H02K 29/00
[52] U.S. Cl. ..................... 318/254; 318/138
[58] Field of Search ............ 318/265, 138, 430, 439, 318/431

[56] References Cited

U.S. PATENT DOCUMENTS

| | | | |
|---|---|---|---|
| 3,909,688 | 9/1975 | Blaschke et al. | 318/702 |
| 4,520,302 | 5/1985 | Hill et al. | 318/696 |
| 4,641,066 | 3/1987 | Nagata et al. | 318/254 |
| 4,673,849 | 6/1987 | Sears et al. | 318/272 |
| 4,678,973 | 7/1987 | Elliot et al. | 318/254 |
| 4,752,724 | 6/1988 | Radziwill et al. | 318/254 |
| 4,772,839 | 9/1988 | MacMinn et al. | 318/696 |
| 4,796,850 | 5/1988 | Abbondanti | 318/723 |
| 4,876,491 | 10/1989 | Squires et al. | 318/254 |
| 4,879,498 | 11/1989 | Shinohara et al. | 318/254 |

OTHER PUBLICATIONS

P. P. Acarnley et al., "Detection of Rotor Position in Stepping and Switched Motors by Monitoring of Current Waveforms", IEEE Transactions on Industrial Electronics, vol. IE-32, No. 3, Aug. 1985.

*Primary Examiner*—David Smith, Jr.
*Attorney, Agent, or Firm*—Flehr, Hohbach, Test, Albritton & Herbert

[57] ABSTRACT

The present method and apparatus detects the rotor position of a brushless DC motor with an accuracy of $\pi/m$ electrical radians (where m = the number of motor phases) within one electrical period, and provides enough information to enable starting the motor in the correct direction with certainty. After starting the motor in an open loop mode of one or two steps, a closed loop mode may be switched on, using a dynamic indirect position detection as is already well known in the technology. More specifically, the position at start is determined by the injection of short current pulses in different motor phases, each phase or pair of phases being energized first by a pulse of one polarity and of the opposite polarity. The sign of the time difference between the decay times of the induced voltages in the un-energized phase is detected. By performing a succession of these tests on different phases or pairs of phases of the standing motor, a table of results is established which clearly defines the position of the rotor relative to the motor phases. The same table then defines what polarity currents should be applied to each phase to reliably and certainly start the motor in the proper direction.

28 Claims, 7 Drawing Sheets

$\Delta t_2 > \Delta t_1$

FIG. 7B

FIG. 8

POSITION DETECTION FOR A BRUSHLESS DC MOTOR WITHOUT HALL EFFECT DEVICES USING A MUTUAL INDUCTANCE DETECTION METHOD

CROSS-REFERENCE TO A RELATED APPLICATION

The present invention is useful in a motor such as shown in U.S. application, Ser. No. 115,268, filed Oct. 30, 1987. Additionally, the invention is useful in motor control methods such as are disclosed in U.S. application Ser. No. 413,311, filed Sep. 27, 1989, and an application entitled POSITION DETECTION FOR A BRUSHLESS DC MOTOR WITHOUT HALL EFFECT DEVICES USING A TIME DIFFERENTIAL METHOD by John Dunfield, U.S. application Ser. No. 07/541,583.

FIELD OF THE INVENTION

The present invention relates to method and apparatus for use with a brushless DC motor which provide the capability of detecting the rotor position when the motor is stopped without the use of known rotor position detecting elements such as Hall elements. The method presented here applies to any type of motor having an excitation flux created by a permanent magnet or by DC current excitation of a winding.

BACKGROUND OF THE INVENTION

Briefly stated, a brushless motor is a motor in which the position of magnetic poles of a rotor are detected by means of a detector directly coupled to the shaft of the rotor. In response to the detected position, semiconductor switching elements such as transistors, thyristors or the like are turned on and off so as to continuously generate torque in the motor. Field windings or a multi-segment permanent magnet are used for the rotor.

The torque is created by application of currents to stator or field windings in sequential order to produce a torque-inducing flux for moving a rotor. The DC currents are alternately switched about the field windings to create various current paths that produce magnetic flux orientations in a synchronized fashion. The magnetic flux so produced results in a torque on the motor that causes the desired rotational movement. In order to ensure that current is applied to the proper motor phase, sensing devices are used to provide information about the position of the rotor. Typically, this information is derived through systems such as Hall sensors, optical sensors or resolvers. These different systems do not give an absolute position, but enough information in order to know the relative position of the rotor in one electrical period. Therefore, it is possible using these devices to energize the motor in such a way that it starts in every case in the correct direction.

Of these, the best known and most commonly used, especially in motors where economy and small size are of significant importance, are Hall sensors. However, the position of the Hall elements must be very precisely fixed. Further, the heat resisting temperature of a Hall element is limited, so that deterioration of the characteristics of the motor can occur if the motor is heavily loaded. Another problem with these sensing device is that they are more prone to failure than most of the devices in which they are used. Thus, the Hall device significantly affects the overall reliability of the apparatus that incorporates the sensing device. Also, incorporating these sensing devices in the motor structure itself increases the motor size, cost, complexity, power consumption and uses space that could be better utilized to increase the rotor size. Additionally, a number of wire leads must be provided to each Hall effect device to bring out the information detected by the Hall device to a microprocessor or the like external to the motor shell.

A number of different solutions to indirect position detection that do not require sensors have been developed. For example, methods disclosed to date include: direct or indirect back EMF detection, as disclosed in V. D. Hair, "Direct Detection of Back EMF in Permanent Magnet Step Motors," Incremental Motion Control Systems and Devices, Symposium, Urbana-Champaign, 1983, pp. 219–221, and K. M. King, "Stepping Motor Control," U.S. Pat. No. 4,138,308, Jan. 23, 1979; a current analysis, as disclosed in B. C. Kuo, A. Cassat, "On Current Detection in Variable-Reluctance Step Motors," Incremental Motion Control Systems and Devices, 6th Annual Symposium, Urbana-Champaign, 1977, pp. 205–220; and two third-harmonic analyses, as disclosed in P. Ferraris, A. Vagati, F. Villata, "PM Brushless Motor: Self Commutating Prerogatives with Magnetically Anisotropic Rotor," Instituto di Elettriche, Politecnico di Torino, Italia, and R. Osseni, "Modélisation et Auto-Commutation des Moteurs Synchrones," EPFL No. 767, 1989. However, these methods do not provide any information about the position of the rotor at standstill. If the electrical drive system has been switched off and the rotor is not turning, it is not possible to know the actual position as related to the stator phases. Thus, at motor start-up, the motor may start in either the correct or incorrect direction. This may not matter for many applications, but in applications, such as driving the spindle motor in a disc drive, this incorrect starting direction is not acceptable.

One known effort to determine the starting position without the use of sensors is disclosed in U.S. Pat. No. 4,876,491. According to this method, a short current pulse is applied to each phase of the motor, and the resulting motor current is measured to determine the positional information of the rotor based on the drive pulse of greatest amplitude. However, the difference between the pulses returned from the different phases may be very small. Measurement accuracy may be affected by temperature and differences between the phase inductances or phase resistances.

Another method used to detect the rotor position at standstill is disclosed in U.S. patent application Ser. No. 413,311. This method drives each phase of the motor with, first, a short positive pulse, and then, a short negative pulse. The maximum amplitudes of the two drive pulses for each phase are then subtracted. The signs of the differences of the pulse amplitude pairs are compared to determine the rotor position. Adaptations of this method include integrating or differentiating the current pulses prior to subtracting them.

A third method for determining the rotor position at standstill involves driving the motor phases with a pair of short pulses, one positive and one negative, as disclosed in an application entitled "POSITION DETECTION FOR A BRUSHLESS DC MOTOR WITHOUT HALL EFFECT DEVICES USING A TIME DIFFERENTIAL METHOD" by John C. Dunfield, U.S. application Ser. No. 07/541,583 now U.S. Pat. No. 5,028,852. In the main, the rise time durations are subtracted and the signs of the differences are compared to determine the rotor position.

Each of the above current detection methods indirectly measure the variations in phase inductance caused by the rotor position in permanent magnet motors. The rotor position detection method of the present invention utilizes the induced voltage in an undriven phase or phase pair that arises from the mutual inductance between the driven and undriven phases. An adaptation of the invention integrates the induced voltage. A caveat must be placed on the use of this technique; therefore, the method of the present invention is only useful in motors that have a significant mutual inductance amongst the phases such as motors having eight poles and six teeth.

SUMMARY OF THE INVENTION

The present method and apparatus detects the rotor position with an accuracy of $\pi/m$ electrical radians (where m = the number of motor phases) within one electrical period, and provides enough information to start the rotor in the correct direction with certainty. After starting the motor in the correct direction using an open loop mode, a closed loop mode may be initiated. A dynamic indirect position detection as is already well known in the technology is contemplated.

More specifically, the position at start-up is determined by the injection of short current pulses in different motor phases, each phase or pair of phases being energized first by a pulse of one polarity and then of the opposite polarity. The induced voltage across the phase that is not being driven, i.e., the voltage coupled to the phase via mutual inductance, is monitored. The voltage can be directly monitored or integrated before monitoring. The time required for the induced voltage to reach a predetermined magnitude or threshold is measured. The drive pulses are long enough to effectuate an accurate measurement, but not so long that the rotor moves. The sign and magnitude of the time difference between the decay times of the two pulses injected into the same phase or pair of phases is determined. By performing a succession of these tests on each of the phases or pairs of phases of the standing motor, a table of the sign of the differences is established which clearly defines the position of the rotor relative to the motor phases. The same table then defines what polarity currents should be applied to each phase to reliably, and with certainty, start the motor in the proper direction.

Another feature of the present invention is the use of the magnitude of the time difference between the decay times (or rise time if coupled voltage integration is used) of the two pulses injected into the same phase or pair of phases as a confidence indicator. For example, if the magnitude of the time difference is large, the system is confident that an accurate representation of the rotor position will be realized by the time difference technique. However, if the magnitude of the time difference is small, there is a chance that the sign of the time difference for a given phase may be incorrect as a result of system noise or other anomalies. To alleviate the potential ambiguity, the system can lower the threshold used to measure the decay time, and consequently, increase the relative magnitudes of the decay times and the confidence level.

This method, in effect, gives results proportional to the mutual inductance of the different motor phases. The mutual inductance is not a function of winding resistance. By using this approach, the measurement is made in such a way that the influence of the temperature on the electrical time constants and the different possible variations in winding parameters are minimized. This method assures starting in the correct direction, and offers the ability to start the motor in the correct direction without detrimental back oscillation.

Other features and advantages of the present invention may become apparent to a person who studies the following disclosure given with respect to the accompanying figures.

DETAILED DESCRIPTION OF A PREFERRED EMBODIMENT

Any polarized motor, such as a brushless DC motor, including permanent magnets or excitation windings, has a local stator and rotor saturation level. As a result of the saturation level of the iron magnetic circuit, phase inductances are a function of rotor position. The approach taken in the present invention is to measure the saturation level of the phase flux versus the current in a phase for each corresponding phase in such a way that the following parameters cannot influence measurement accuracy:

- temperature effect on resistance in the phase;
- the relatively small differences between the inductances created in the magnetic circuits;
- a relatively high frequency is used to measure the inductance, deleterious secondary effects, such as eddy currents, are small.

Distinctively, the present invention measures the saturation level indirectly via monitoring the voltage induced in at least one un-energized winding.

The method disclosed below and the apparatus used to implement it provide a reliable and efficient approach to determining the starting position for a motor, particularly a low power motor.

In the magnetic circuit of a motor phase winding, with current, two effects are superimposed: 1) the permanent magnet flux (or the DC current excitation winding flux); and 2) the current flux. The total flux in a given phase can be expressed as follows:

$$\Psi_{phase} = \Psi_{PM} + L \cdot i$$

where:
$\Psi_{phase}$ = total flux in the phase $\Psi$PM = total flux created by the permanent magnet or DC current excitation in the corresponding phase L = inductance of the phase; L is a function of the current i and the motor rotor position $\bar{a}$ i = current in the phase.

Consequently, the total flux $\Psi$phase can be increased or decreased by the current effect, thus modifying the saturation level.

If $\Psi$phase > $\Psi$PM, the magnetic circuit is more saturated due to the additional effect of the current $i^+$, and the corresponding inductance can be written as:

$$L = L_o - \Delta L^+ \quad [2]$$

where:

$L_o$ = inductance of the phase when current equals zero $\Delta L^+$ = incremental change in inductance when current is different from zero ($i^+$)

$i^+$ = current in the phase, the current creates a positive flux (same flux direction as $\Psi$PM).

On the other hand, if $\Psi$phase < $\Psi$PM, the magnetic circuit is less saturated due to the subtracting effect of the current $i^-$, and the inductance can be written as follows:

$$L = L_o + \Delta L^- \quad [3]$$

where:

$\Delta L^-$ = incremental change in inductance when current is different from zero ($i^-$)

$i^-$ = current in phase, the current creates a negative flux (opposite direction of the $\Psi$PM flux).

Figure 1:
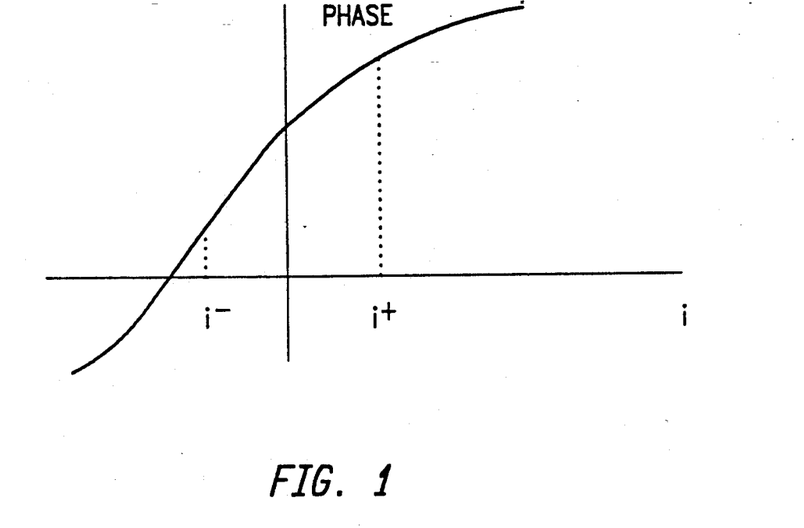
FIG. 1 illustrates phase flux versus current in a phase of a brushless DC motor.

FIG. 1 represents the two possible cases for a given position when motor is in a standstill state.

Current $i^+$ and current $i^-$ are of opposite direction, consequently of opposite sign, and L = L(i).

Heretofore, rotor location methods indirectly measured the inductance; the idea has been to analyze the current evolution. At standstill, the phase current can be written as:

$$i = U/R(1 - e^{R/L \cdot t}) \quad [4]$$

Where:

U = applied voltage to the phase

R = total resistance of the phase t = time i = current in the phase

Figure 2:
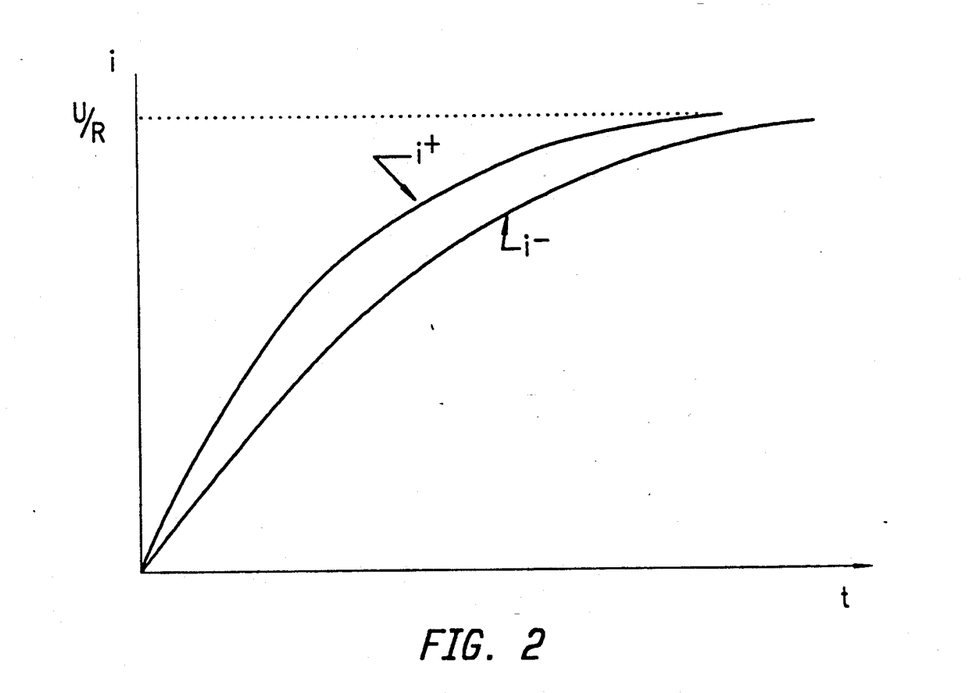
FIG. 2 illustrates current rise versus time in a brushless DC motor.

Applying equation [4] to the two cases, the current is expressed as follows (see FIG. 2):

$$i^+ = \frac{U}{R}(1 - e^{\frac{-R \cdot t}{L_o - \Delta L^+}}) \quad [5]$$

$$i^- = \frac{U}{R}(1 - e^{\frac{-R \cdot t}{L_o - \Delta L^-}}) \quad [6]$$

FIG. 2 shows the two different currents, where current $i^-$ is represented by its absolute value. However, the measurable currents are functions of the winding resistance as well as the inductance. Resistance variations will cause unnecessary errors in the rotor position determination.

The preferred embodiment of the present invention avoids the potential for error due to the winding resistance by measuring the inductance value directly. Mathematically the voltage and current relationships amongst the phases for a three-phase motor can be expressed as a matrix equation:

| $v_1 =$ | X | Y | Y | $i_1$ | | kwsin$\Phi$ | [7] |
|---|---|---|---|---|---|---|---|
| $v_2 =$ | Y | X | Y | $i_2$ | + | kwsin($\Phi$ − 120°) | |
| $v_3 =$ | Y | Y | X | $i_3$ | | kwsin($\Phi$ − 240°) | |

Where:

$$X_{kk} = R_k + L_k \frac{di}{dt} k \quad k = 1, 2, \text{ or } 3$$

$$Y_{jk} = M \cdot \frac{di}{dt} k \quad M = f(L) = C(L_o \pm \Delta L^\pm); j \neq k$$

kwsin$\Phi$ are back emf terms.

M is the mutual inductance term. It is a function of the phase inductance, including the variations caused by the rotor position, and a constant, usually about 0.5 for the class of spindle motors including: 8-pole, 12-teeth; 12-pole, 9-teeth; 8-pole, 6-teeth, etc.

Figure 3A:
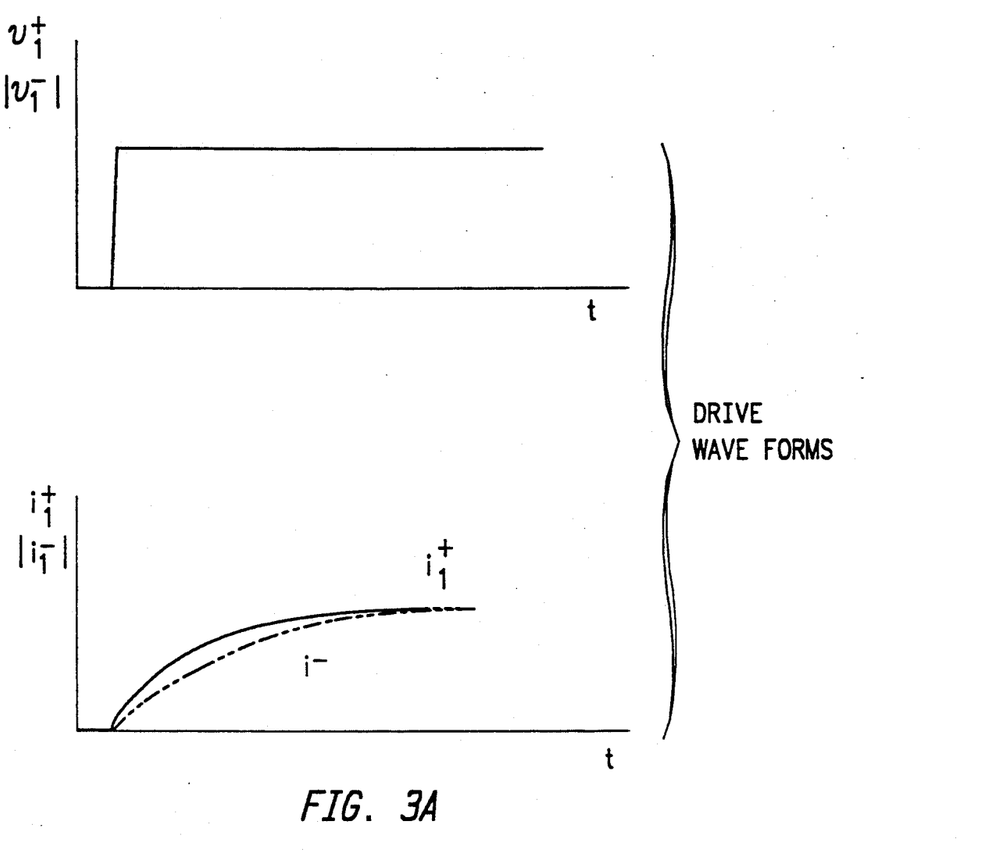
FIGS. 3A, 3B illustrate the amplitude of the drive current and voltage as compared to the amplitude of the voltage induced in the un-energized phase of a three-phase motor.
Figure 3B:
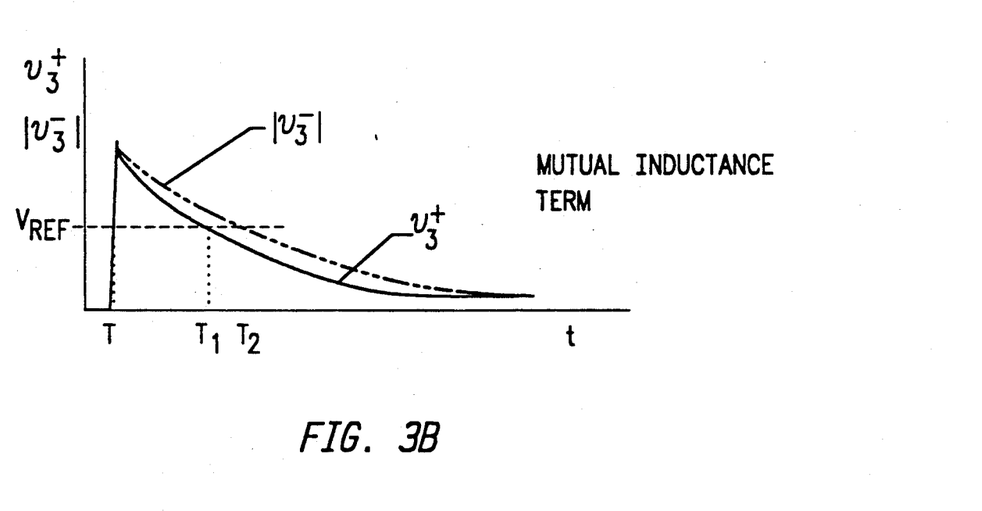

The set of equations [7] establish that driving one phase, for example phase 1, with a given current pulse, $i_1$, will cause a voltage in phase 2, $v_2$, that is directly proportional to the phase inductance via the mutual inductance term, $Y_{12}$. FIG. 3 depicts the drive voltage $v_1$ and current pulse il as compared to the induced voltage $v_3$ in the non-driven phase of a three-phase motor. Equation set [7] shows that either each phase can be driven independently, or the phases can be driven as phase pairs without compromising the detectibility of the mutual inductance term.

The rise time of the induced voltage is virtually instantaneous. Defining a fixed voltage threshold $V_{ref}$, it is possible to compare the time required for each induced voltage to rise through the reference level and decay back to the predetermined reference value. FIG. 3 depicts this scenario. However, since the rise time is infinitesimal, the decay duration, $T_1 - T_0$ or $T_2 - T_0$ in FIG. 3, is the controlling function. Therefore, the time required to reach an arbitrarily set voltage magnitude on each voltage response curve is substantially a function of the decay time.

However, the decay duration can be referenced to any time, $T_0$. For instance, the point at which the driver begins the short pulse is an easily-implemented reference point.

Figure 4:
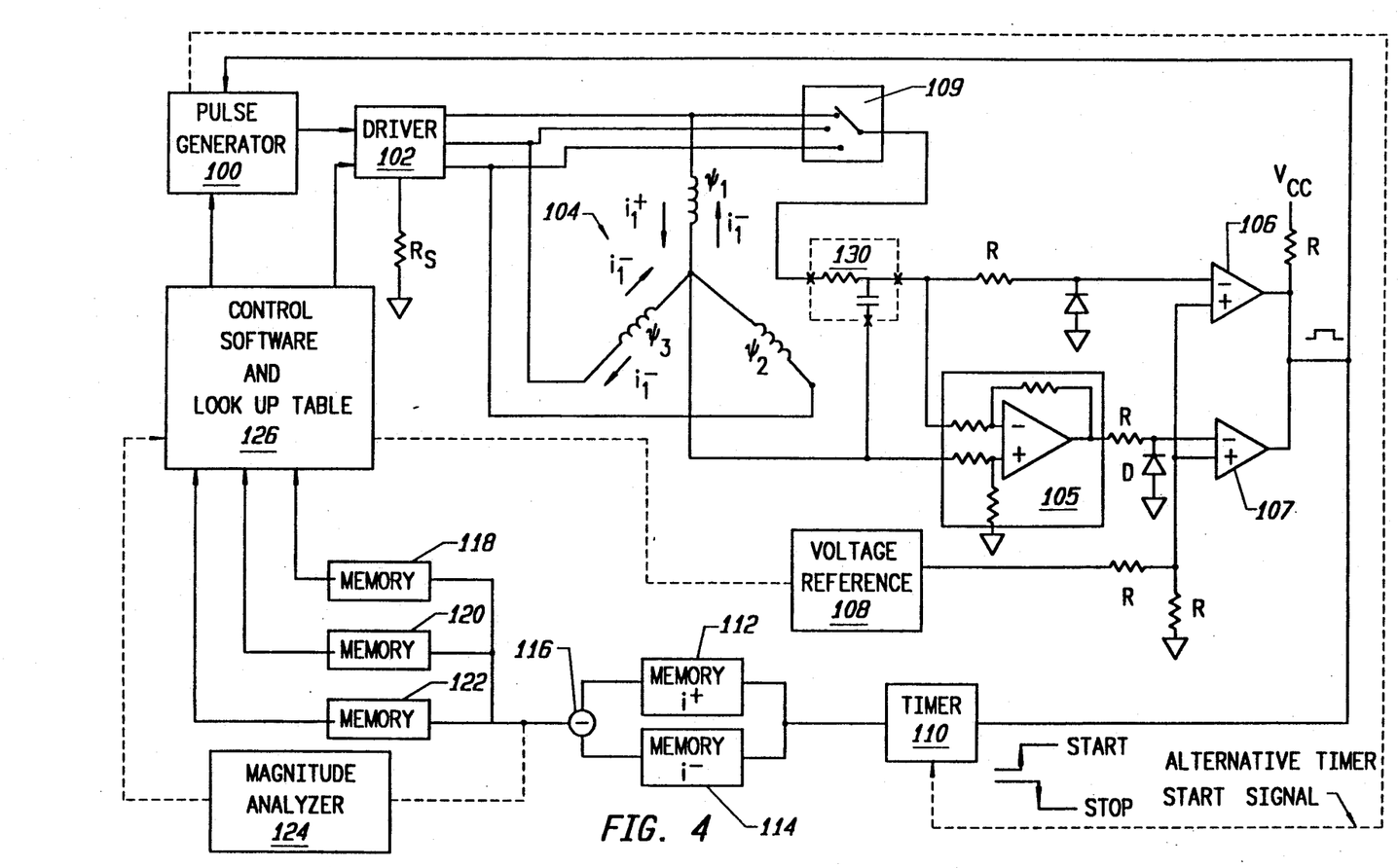
FIG. 4 is a block diagram which may be used to understand the approach to position detection according to the present invention.

An example of the apparatus used to measure motor position at standstill using the method of the present invention is depicted in FIG. 4 for a three-phase motor. The process described the following discussion is not intended to be exhaustive, but merely an example. Other implementations for phase-to-phase, low-level signal detection are possible.

According to this exemplary embodiment, using a pulse generator 100 through a driver 102, each phase of a motor 104 is supplied first with a positive current $i_1^+$ and then with a negative current $i_1^-$. The phase to be monitored is chosen by switch 109. The rising edge of the induced voltage $v_3$ caused by $i_1^+$ triggers the comparator 106 as the value of the induced voltage exceeds the reference voltage of source 108. The rising edge of the comparator output starts the timer 110. Most simply, timer 110 is a digital counter. Alternatively, the pulse generator 100 output could be used to start the timer 110 at the time that the pulse generator 100 pulses the driver 102.

Each phase is supplied the current until the voltage across the undriven phase, $\Psi_3$ in FIG. 4, becomes smaller than the comparator's 106 reference voltage 108. At this point, the comparator's output toggles to a new state and signals both the pulse generator 100 and the timer 110 to stop. The elapsed time of the comparator's output pulse is stored in memory 112. The same phase pair, $\Psi_1$ and $\Psi_2$, is now energized using a negative current $i_1^-$ through driver 102. The resulting induced voltage is inverted by circuit 105 and triggers comparator 107 when it exceeds a predetermined threshold set by a voltage source 108 and resets the comparator 107 when the voltage falls below the threshold. The timer 110 is triggered by a signal from the comparator 107 which corresponds to the leading edge of the voltage pulse and is stopped by the comparator 107 trigger as the voltage falls below the threshold. The duration of the negative signal is stored in memory 114.

The reference voltage source 108, in its simplest form, is fixed. The same power supply used to power the other components of the system should be used as the reference source 108. This will take advantage of the common-mode rejection of the comparator 106, 107 to limit the effects of power supply noise on the position detection system. To enhance the system's efficacy, source flexibility using a digital-to-analog converter controlled by a micro-processor is useful in tailoring the reference voltage to a specific application or allowing the reference voltage to be dynamically changed to accommodate motor parameter variations.

Figure 5:
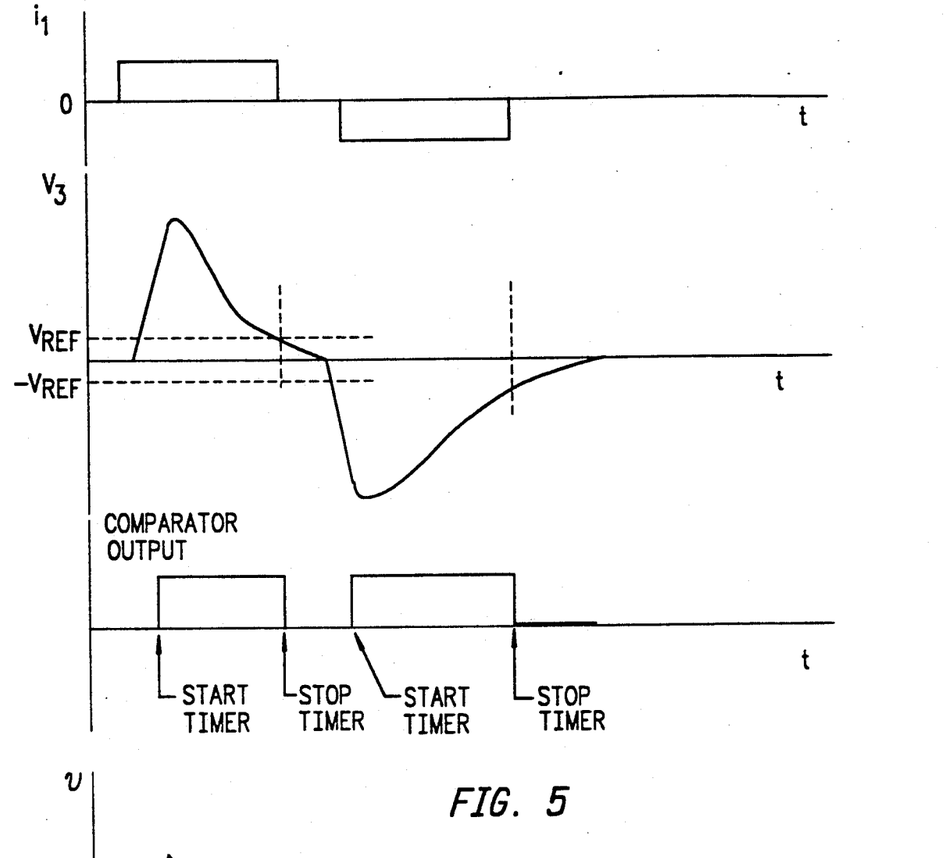
FIG. 5 is a timing diagram for the block diagram of FIG. 4.

An optional improvement on the present invention is realized by utilizing the magnitude of the time difference to provide a confidence indicator as to the validity of the sign determination. The circuit is called the magnitude analyzer 124. For example, the system may not decide on the correct value of the sign if the magnitude is small and susceptible to noise corruption. Therefore, a higher confidence is realized if the magnitude of the difference is significant. A determination of a low confidence level will inhibit the use of the position information and the position detection process is repeated. If a variable reference source is used, the threshold level $V_{ref1}$ may be lowered $V_{ref2}$ to create a larger time difference $\Delta t_2$, see FIG. 5, and increase the confidence in the measurement. However, the addition of the magnitude analyzer 124 and variable threshold circuitry (within 126) increases the complexity of the system.

The two stored time values are subtracted 116 and the sign of the difference is stored in another memory location 118. The timer 110, subtractor 116, and all of the memory locations 112, 114, 118, 120, 122 could either be constructed using discrete hardware components or their functions could be accomplished by the disk drive's on-board microprocessor as software functions.

The process described above is repeated for each of the windings resulting in two more memory locations 120, 122 being filled with sign values. The vector of sign values is used to point into a look-up table 126, typically defined by software. The look-up table 126 provides the phase excitation order necessary to start the motor in the proper direction. The correct phase excitation order is sent to driver 102 and motor 104 is started in the desired direction. However, if the magnitude of the time difference for any one of the phases indicates that the position may be erroneous, the state selection process will be inhibited and the position detection process will be repeated using a different reference voltage level.

The table below depicts a typical look-up table for a 3-phase star configuration motor. The sign of the time difference is encoded such that a positive value is a digital 1 and a negative value is a digital 0. The three bit vector describes a particular rotor position with a $\pi/3$ or 60 degree accuracy. Using this position vector, the corresponding phase excitation sequence is determined and executed.

The following table provides the first switching sequence:

| Rotor Position in Electrical Degree | Sign of | | | Phase Excitation | | |
| --- | --- | --- | --- | --- | --- | --- |
| | $\Delta t1$ | $\Delta t2$ | $\Delta t3$ | $\Phi1$ | $\Phi2$ | $\Phi3$ |
| 0 ± 30 | 0 | 1 | 0 | 1 | 0 | 0 |
| 60 ± 30 | 0 | 1 | 1 | 1 | 1 | 0 |
| 120 ± 30 | 0 | 0 | 1 | 0 | 1 | 0 |
| 180 ± 30 | 1 | 0 | 1 | 0 | 1 | 1 |
| 240 ± 30 | 1 | 0 | 0 | 0 | 0 | 1 |
| 300 ± 30 | 1 | 1 | 0 | 1 | 0 | 1 |

This combination of circuitry and software insures that the rotor will start in the correct direction without the use of Hall devices or other more intrusive means of detecting rotor position.

Figure 8:
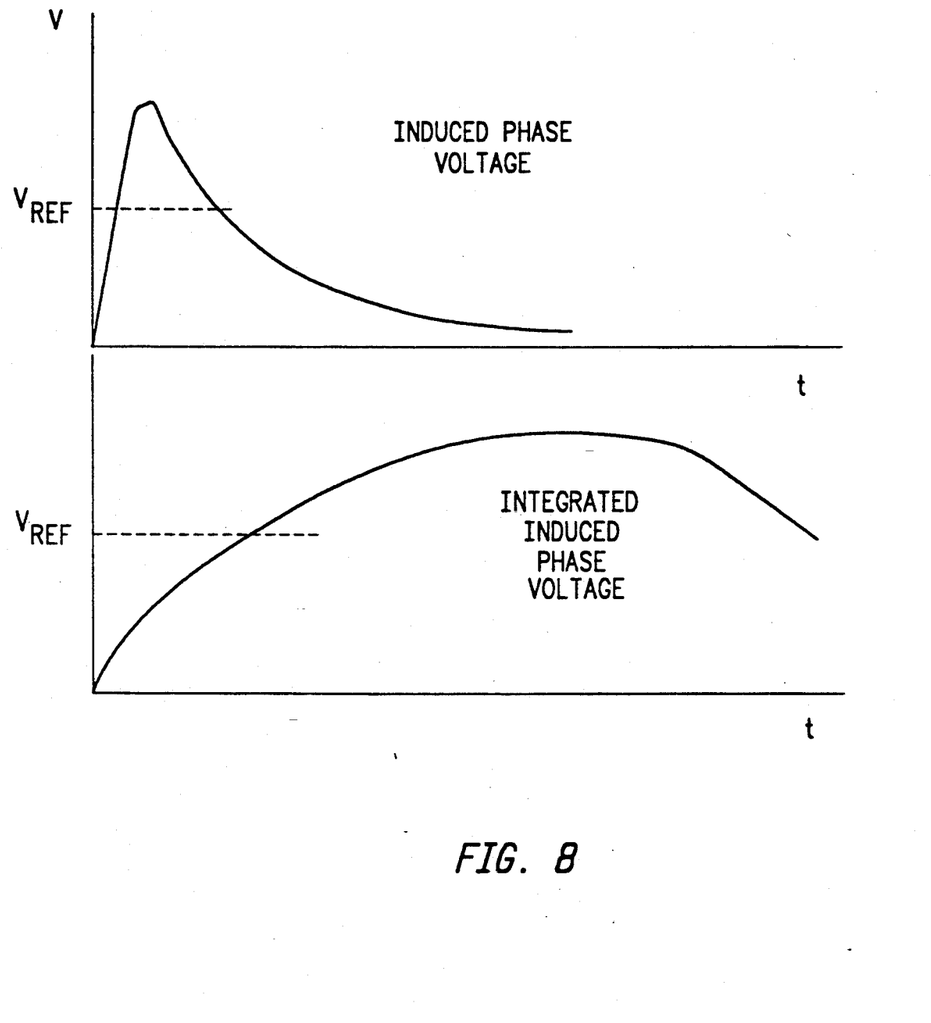
FIG. 8 illustrates the integrated coupled signal.

An alternative embodiment of the present invention includes an integrator circuit 130 between the windings centertap and the comparators 106, 107 as shown in FIG. 4. Most simply, the integrator circuit 130 is accomplished with a passive low pass filter, as depicted. However, an active integrator using an operational amplifier could also be utilized. The integrated coupled signal is illustrated in FIG. 8. The comparators 106, 107 measure signal rise time to a threshold rather than decay time as in the previously-described embodiment. The inclusion of the integrator may provide error protection via enhanced noise immunity for the system.

Figure 6:
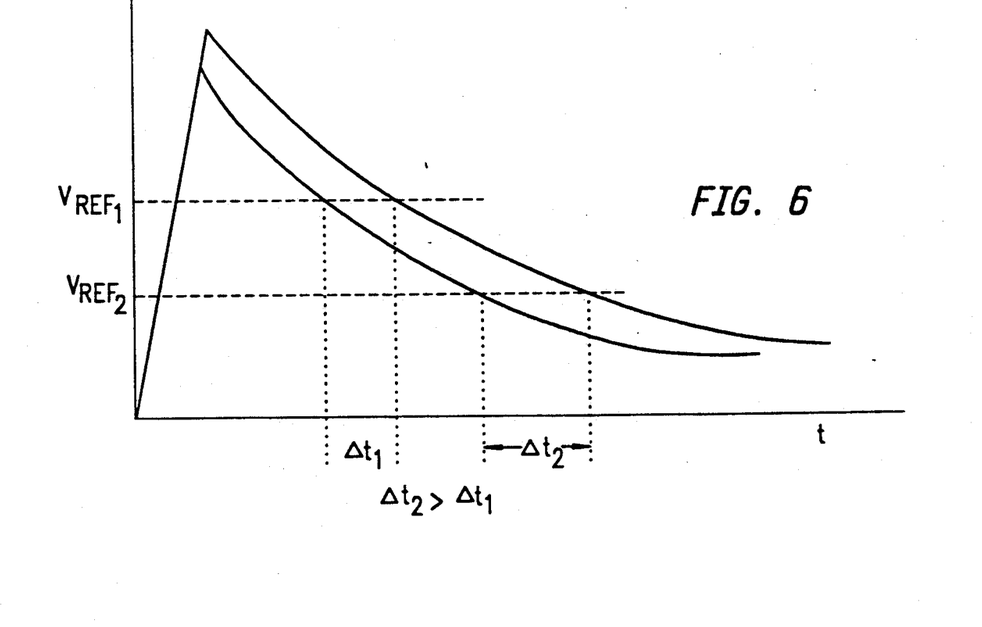
FIG. 6 illustrates the usefulness of incorporating the optional feature of a variable voltage reference into the present invention.
Figure 7A:
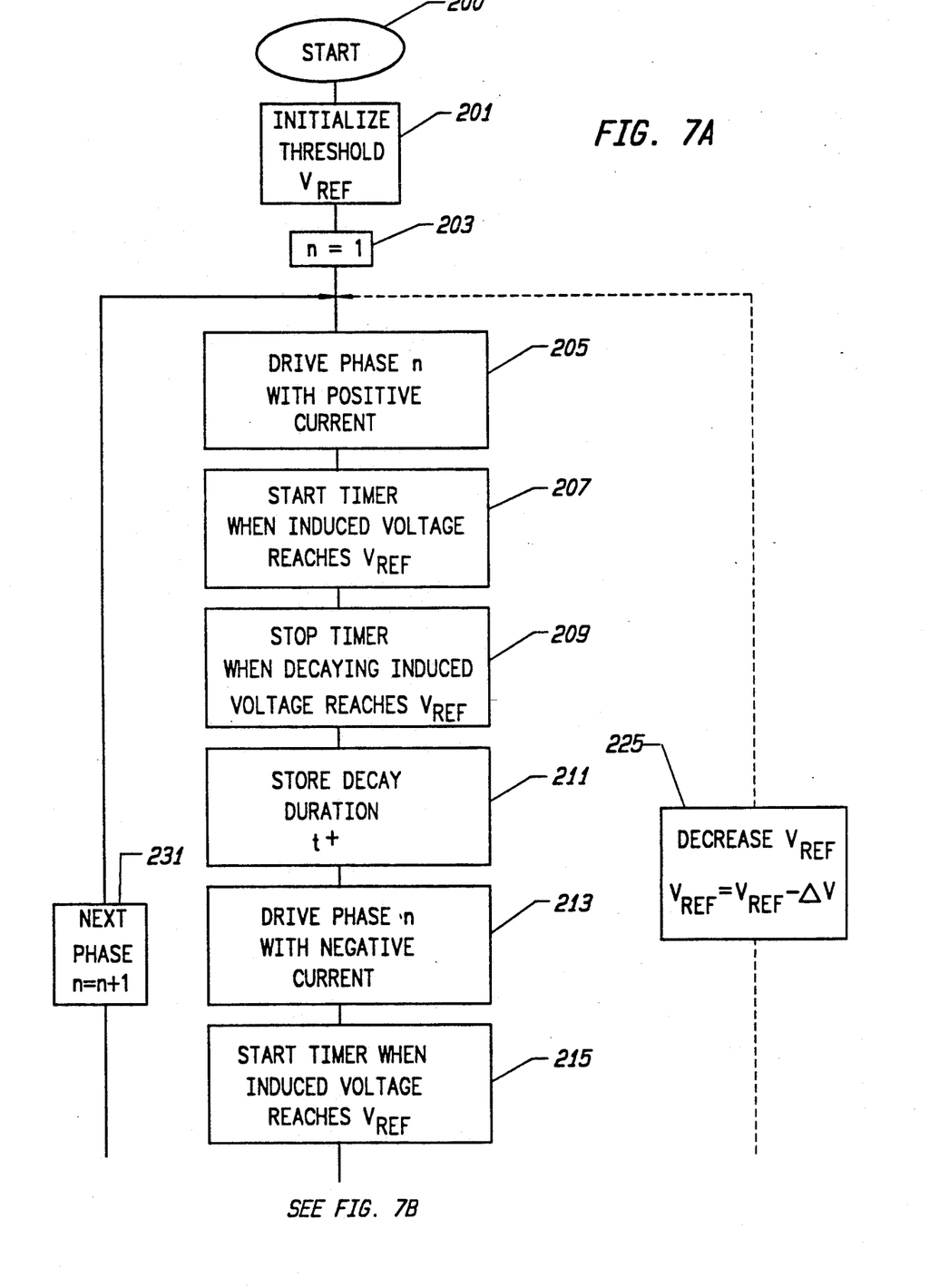
FIGS. 7A, 7B are a flow chart summarizing the rotor position detection and motor start-up process of the present invention.
Figure 7B:
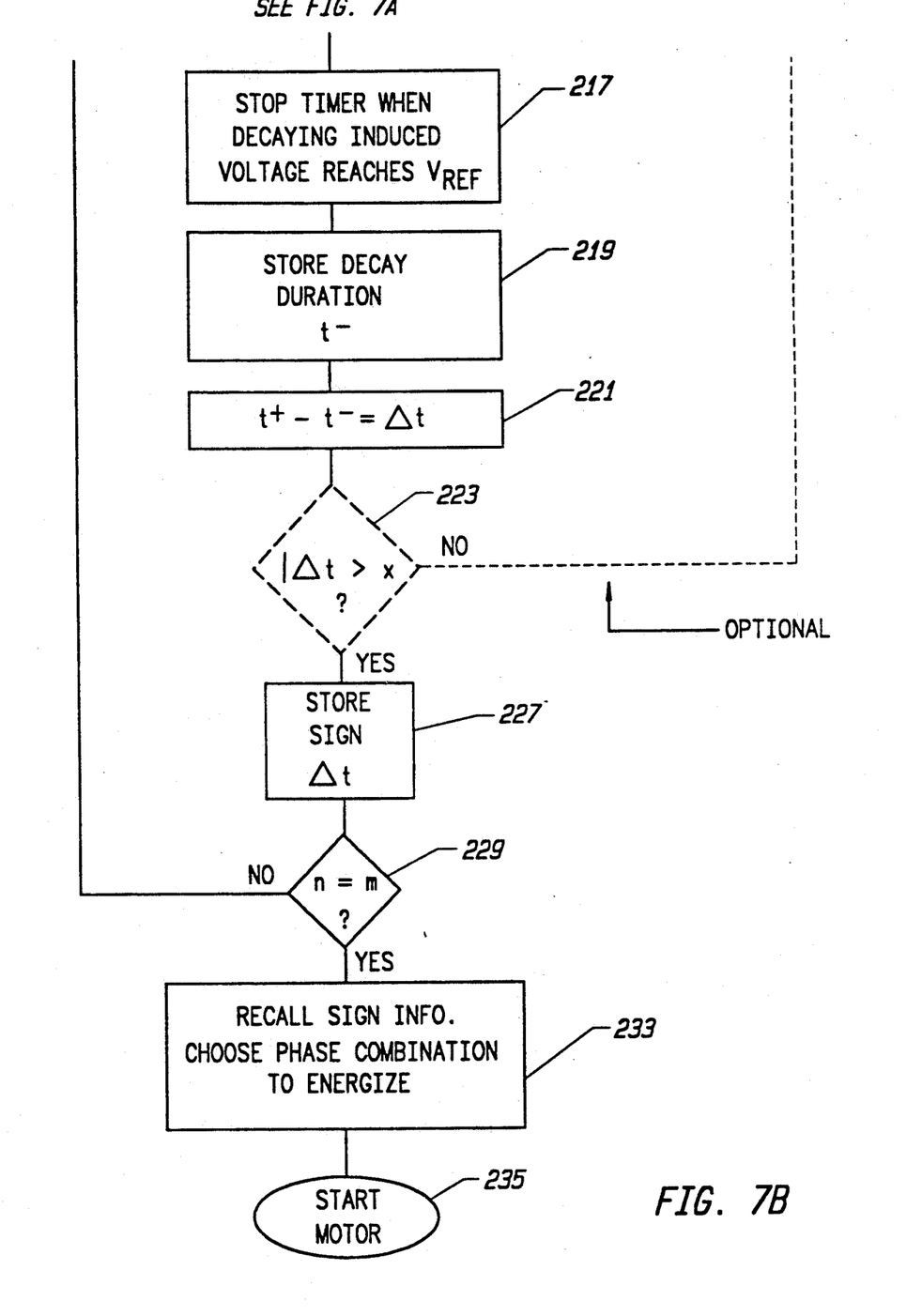

In summary, the preferred embodiment of the present invention can be depicted as a flow chart as shown in FIG. 6. The motor 104 is at a standstill at the flow chart start 200. Both the threshold level $V_{ref}$ and the phase counter are intitialized 201, 203. Phase n, or a combination of phases n, is driven in step 205 with a short positive current pulse. A counter is started at step 207 when the induced voltage rises in the un-energized phases above the threshold $V_{ref}$. The counter is stopped at step 209 when the decaying induced voltage falls below $V_{ref}$. The time duration determined by the counter is stored in step 211 as $t^+$. The same phase (or phase combination) is then pulsed with a short negative current and the decay time is again measured, steps 215, 217 and 219. The negative pulse's decay time is represented by $t^-$. In step 221, the decay time from the negative pulse $t^-$ is subtracted from the decay time of the positive pulse $t^+$. The result is the time difference between the decay times represented by $\Delta t$.

The sign of $\Delta t$ is stored in memory at step 227. Step 229 determines if all the phases m have been tested. If not, the phase number is incremented by 1, step 231, and the process repeats at step 205 by pulsing the next phase. If all of the phases have been addressed by the system, i.e., n equals m, then the stored values of the sign of the time differences are accessed and used to determine the position of the rotor at step 233. A look-up table, as previously described, is used to determine which phases must be energized to accurately start the motor and the motor is started in step 235. Thus, ending the process of the present invention.

However, at the expense of additional complexity, improvement in the position detection system's performance is achievable. The sign of the difference may not be consistently determinable if the magnitude is small and corrupted by noise. Therefore, step 223 compares the magnitude of Δt to a confidence factor X. The magnitude of X depends on motor characteristics. If Δt is less than X, the system is not confident that the sign of Δt is accurately determinable. Subsequently, step 225 is initiated.

It subtracts an increment from the threshold level $V_{ref}$ and then returns the process to step 205, repeating the position detection process and achieving a greater time differential between $t^-$ and $t^+$. However, the additional increment will slow the position determination process.

Previous methods used to determine position of the rotor have always driven a phase or set of phases with a short current pulse or set of current pulses and monitored the response to said current pulses on the same phases which were driven. Monitoring apparatus of prior methods observed peak voltage responses amongst all phases, peak voltage responses amongst phase pairs, or variations in pulse rise times in response to the drive current pulse. The observed voltages or rise times are determinative of rotor position.

In the correct invention, the same phenomenon can be monitored; i.e., voltages or rise times, but the monitoring apparatus functions by observing the responses induced in the unenergized phase. The result is the same, but the method of achieving the result is very different. An accurate measure of the rotor position is achieved, but the present invention's use of the mutual inductance removes the detrimental effects of phase winding resistance variations.

While the present invention has been described with reference to a specific embodiment, the description is illustrative of the invention. Various modifications may occur to those skilled in the art without departing from the true spirit and scope of the invention as defined by the appended claims.

What is claimed is:

1. In a brushless DC motor having multiple windings arranged as a stator and a permanent magnet rotor or a DC current excitation winding, apparatus for controlling ordered application of electrical current to the windings and measuring the response thereto for identifying a rotational position of said magnetic rotor relative to said windings without rotational movement of said rotor comprising:

circuit means coupled to the windings for selectively establishing current paths through selected windings in response to control signals, driver means for applying short duration current pulses of first and second opposite polarities to each said selected winding, monitoring means for detecting the induced voltage detected at an un-energized winding by each of said applied current pulses of opposite polarities, and detection means for identifying a rotational position of said magnetic rotor relative to said windings based on the sign of the time difference between decay time of the induced voltage responses to said pulses applied to the same said selected winding.

2. The motor of claim 1 wherein said windings are ordered in phases and said driver means apply current pulses first of one polarity and then of the opposite polarity to the same one of said phases, said monitoring means detecting said induced voltage established in response to said applied current pulses.

3. The brushless DC motor of claim 1 wherein said windings are arranged in three phases, said phases being selectively connected in pairs so that the current pulses are applied with alternating polarities to each pair of said plurality of pairs.

4. The brushless DC motor of claim 1 wherein said detection means includes means for determining the decay time of each of said responses to said current pulses from the rising edge of said induced voltage to a point where the amplitude of said induced voltage has reached a fixed reference level, means for subtracting one of said decay times from the other of said decay times, means for determining the magnitude of said decay time difference, and means for determining said sign of said decay time difference.

5. The brushless DC motor of claim 1 wherein said detection means includes means for determining the decay time of each of said responses to said current pulses from an arbitrary reference time to a time where the amplitude of said induced voltage has reached a fixed reference level, means for subtracting one of said decay times from the other of said decay times, means for determining the magnitude of said decay time difference, and means for determining said sign of said decay time difference.

6. The motor of claims 4 or 5 wherein said sign of said decay time difference is used to determine the rotor position within said motor and said magnitude of said decay time difference is used to determine the accuracy of said rotor position determination.

7. The brushless DC motor of claims 4 or 5 including means for varying said reference level depending on said magnitude of said decay time difference.

8. The brushless DC motor of claim 1 further including means for integrating said induced voltage and wherein said detection means identifies a rotational position of said magnetic rotor relative to said windings based on the sign of the time difference between rise time of the integrated induced voltage responses to said pulses applied to the same said selected winding.

9. A commutatorless direct current motor comprising a plurality of windings connected to define m phases of said motor, a permanent magnet or DC current excitation winding positioned relative to said windings and rotatable relative to said windings and comprising means for establishing first, fixed magnetic fields, driver means connected to said plurality of windings for applying short term current pulses of opposite polarity separately to at least one phase thereof for inducing at least one second, controlled magnetic field in nonenergized phases of said motor without causing rotational movement of said permanent magnet or DC excitation winding, monitoring means for detecting each voltage induced in one of said phases that is not being driven by said applied current pulses, each said voltage representing the interaction of said first, fixed magnetic field and said second, current pulse induced magnetic field, and detection means for identifying a rotational position of said magnet relative to said windings based on the sign of the time difference between the decay time of said induced responses to said pulses.

10. The motor of claim 9 wherein said monitoring means detects the voltage induced in the un-energized phase obtained in response to the application of each current pulse to each said phase of windings.

11. The motor of claim 9 wherein said windings are arranged in three phases, said phases being selectively connected in pairs so that the current pulses are applied with alternating polarities to each pair of said plurality of pairs.

12. The motor of claim 9 wherein said detection means comprises means for determining the rise time of each of said responses to said current pulses from the rising edge of said induced voltage to a point where the amplitude of said induced voltage has decayed to a fixed reference level, subtracting one of said decay times from the other of said decay times, determining the magnitude of said decay time difference, and determining said sign of said decay time difference.

13. The motor of claim 12 wherein said detection means comprises means for determining the rise time of each of said responses to said current pulses from an arbitrary reference time to a time where the amplitude of said induced voltage has decayed to a fixed reference level, subtracting one of said decay times from the other of said decay times, determining the magnitude of said decay time difference, and determining said sign of said decay time difference.

14. The motor of claims 12 or 13 including means for utilizing said sign of said decay time difference to determine the rotor position within said motor and utilizing said magnitude of said decay time difference to determine the accuracy of said rotor position determination.

15. The motor of claims 12 or 13 including means for establishing said reference level as a variable reference level, said reference being varied depending on said magnitude of said decay time difference.

16. The motor of claim 9 further including means for integrating said induced voltage and wherein said detection means identifies a rotational position of said magnetic rotor relative to said windings based on the sign of the time difference between rise time of the integrated induced voltage responses to said pulses applied to the same said selected winding.

17. In a brushless DC motor having multiple windings arranged as a stator and a permanent magnet rotor or a DC current excitation winding, a method for controlling ordered application of electrical current to the windings and measuring the response thereto to determine the initial position of said rotor relative to said windings without rotational movement of said rotor comprising the steps of
coupling circuit means to the windings for selectively establishing current paths through a selected winding or windings in response to control signals,
applying short duration current pulses of first and second opposite polarities to each said selected winding,
detecting the voltage induced in an un-energized phase by each of said applied current pulses of opposite polarities, and
identifying a rotational position of said magnetic rotor relative to said windings based on the sign of the time difference between a decay time of the induced responses to said pulses applied to the same said selected winding.

18. The brushless DC motor of claim 17 wherein said method further includes the steps of determining the decay time of each of said responses to said current pulses from the rising edge of said induced voltage to a point where the amplitude of said induced voltage has reached a fixed reference level, subtracting one of said rise times from the other of said decay times, determining the magnitude of said decay time difference, and determining said sign of said decay time difference.

19. The brushless DC motor of claim 18 wherein said method further includes the steps of determining the rotor position within said motor using said sign of said decay time difference and determining accuracy of said rotor position determination using said magnitude of said decay time difference.

20. The brushless DC motor of claim 19 wherein said method further includes the steps of using a variable reference level and Varying said variable reference level depending on said magnitude of said decay time difference.

21. The brushless DC motor of claim 17 wherein said method includes integrating said induced voltage and identifying said rotational position of said magnetic rotor based on the sign of the time difference between rise times of said integrated induced responses to said pulses applied to the same said selected winding.

22. In a brushless DC motor having multiple windings arranged as a stator and a permanent magnet rotor or a DC current excitation winding, apparatus for controlling ordered application of electrical current to the windings and measuring the response thereto for identifying a rotational position of said magnetic rotor relative to said windings without rotational movement of said rotor comprising:
circuit means coupled to the windings for selectively establishing current paths through selected windings in response to control signals,
driver means for applying short duration current pulses of first and second opposite polarities to each said selected winding,
monitoring means for detecting the induced voltage detected at an un-energized winding by each of said applied current pulses of opposite polarities, and
integrating means for integrating said induced voltage and detection means for identifying a rotational position of said magnetic rotor relative to said windings based on the sign of the time difference between rise time of the integrated induced voltage responses to said pulses applied to the same said selected winding.

23. The motor of claim 22 wherein said windings are ordered in phases and said driver means apply current pulses first of one polarity and then of the opposite polarity to the same one of said phases, said monitoring means detecting said induced voltage established in response to said applied current pulses.

24. The brushless DC motor of claim 22 wherein said windings are arranged in three phases, said phases being selectively connected in pairs so that the current pulses are applied with alternating polarities to each pair of said plurality of pairs.

25. The brushless DC motor of claim 22 wherein said detection means includes means for determining the rise time of each of said responses to said current pulses to a point where the amplitude of said induced voltage has reached a fixed reference level, means for subtracting one of said rise times from the other of said rise times, means for determining the magnitude of said rise time difference, and means for determining said sign of said rise time difference.

26. The brushless DC motor of claim 22 wherein said detection means includes means for determining the rise time of each of said responses to said current pulses from an arbitrary reference time to a time where the amplitude of said induced voltage has reached a fixed reference level, means for subtracting one of said rise times from the other of said rise times, means for determining the magnitude of said rise time difference, and means for determining said sign of said rise time difference.

27. The motor of claims 25 or 26 wherein said sign of said rise time difference is used to determine the rotor position within said motor and said magnitude of said rise time difference is used to determine the accuracy of said rotor position determination.

28. The brushless DC motor of claims 25 or 26 including means for varying said reference level depending on said magnitude of said rise time difference.

* * * * *